April 4, 1961  C. H. NORDELL  2,978,106
RAG CATCHER
Filed April 28, 1954
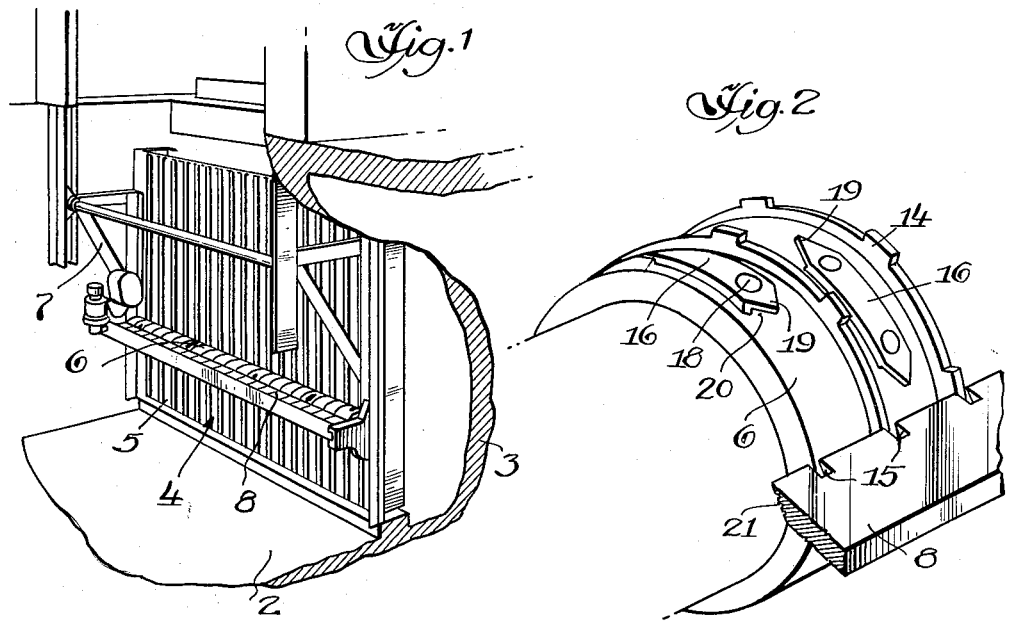
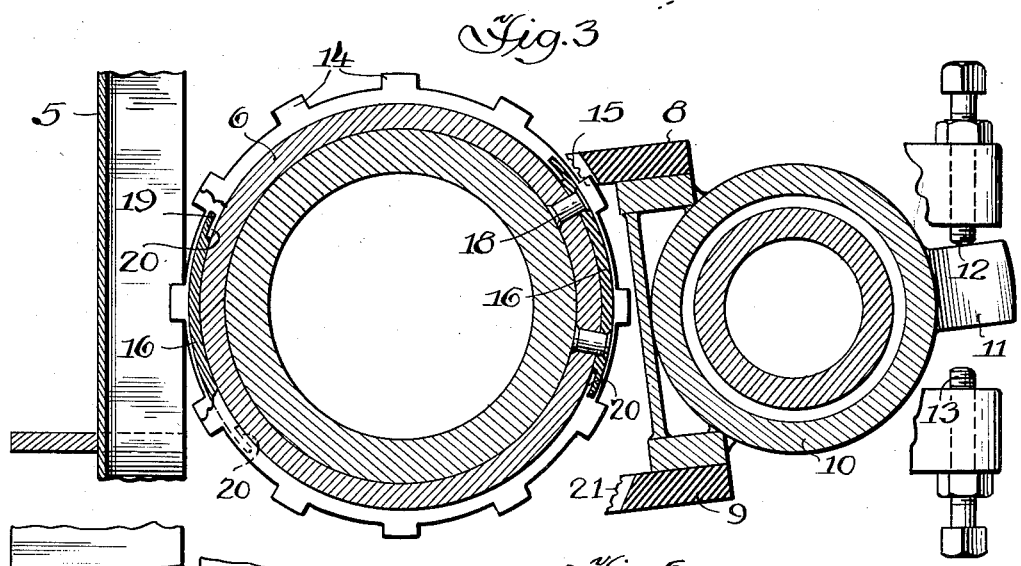
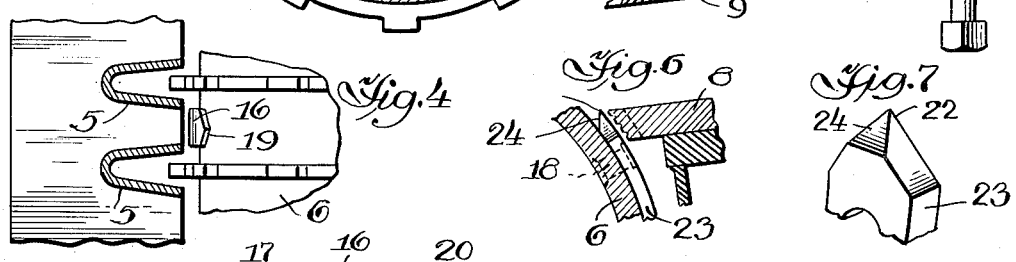
Inventor,
Carl H. Nordell
By: Schneider & Dressler, Attys.

United States Patent Office 2,978,106
Patented Apr. 4, 1961

2,978,106

RAG CATCHER

Carl H. Nordell, 669 Chino Canyon Road, Palm Springs, Calif.

Filed Apr. 28, 1954, Ser. No. 426,093

1 Claim. (Cl. 210—173)

This invention relates to a rag catcher with particular reference to a rag catcher mounted on a cutting cylinder in a sewage comminuating device.

Rags, paper, string and other similar solid matter of a fibrous nature contained in a stream of liquid sewage flowing through a screen into a sewage treatment plant is often caught in the spaces between adjacent screen bars. Such solids may be lodged in such position that they are not engaged by the cutting cylinder, with the consequent result that they clog portions of the screen and reduce the efficiency of the screening process.

In accordance with the present invention a rag catcher is mounted on the periphery of the cutting cylinder between each row of teeth. Each rag catcher is aligned with the space between two adjacent screen bars and is arranged either to pass into such space or to pass very close to it, so that any rags intercepted by the screen and not removed therefrom by the teeth of the cutting cylinder are engaged by the rag catcher. Rags engaged by the rag catcher wrap themselves around the cutting cylinder and are carried by it from the screen to the comb of the comminuting device where part of the mass of rags is comminuted along with the other solids removed from the screen. The portion of the mass of rags that is not comminuted remains wrapped around the cylinder, and as it passes the screen it acts as a brush or wiper to clean the spaces between screen bars and also picks up additional rags that have been intercepted by the screen.

The rag catcher of the present invention is pointed at each end so that it may be used with a cutting cylinder that rotates in both directions. The pointed end will split and dislodge sticks caught between the screen bars. The ends of the rag catcher are undercut a short distance to facilitate catching rags, but the undercut is not deep enough to cause the rag catcher to pick up heavy wire or nails.

The rag catchers are secured individually to the spacers between rows of cutting teeth so that if any rag catcher gets broken or wears too much for further use it may be replaced.

The structure by means of which the above and other advantages are attained will be described in the following specification, taken in conjunction with the accompanying drawing, showing a preferred illustrative embodiment of the invention, in which:

Fig. 1 is a fragmentary perspective view of a comminuting device embodying the invention, shown in conjunction with a screen mounted in a sewage channel;

Fig. 2 is a fragmentary perspective view of a cutting cylinder with the rag catcher mounted thereon;

Fig. 3 is a cross sectional view showing the relationship of the cutting cylinder, on which the rag catcher is mounted, to the combs of the comminuting unit and to the screen;

Fig. 4 is a fragmentary detail view, partly in elevation and partly in section, showing the rag catcher adjacent the space between the screen bars;

Fig. 5 is a detail perspective view of the rag catcher;

Fig. 6 is a fragmentary detail view showing another embodiment of the rag catcher in position adjacent the comb of the comminuting unit; and Fig. 7 is a fragmentary detail perspective view of one end of the rag catcher shown in Fig. 6.

Referring to Fig. 1 of the drawings, the reference numeral 2 indicates an influent channel and 3 indicates an effluent channel which are parts of a single structure that are separated by a vertical screen 4. Channels 2 and 3 are preferably built of concrete. Liquid sewage flows from channel 2 into channel 3, and solids too large to pass between the screen bars 5 are intercepted thereby. A rotatable cutting cylinder 6 is mounted, as indicated at 7, for vertical reciprocation adjacent the face of screen 4. The cylinder removes the solids from the face of the screen and transfers them to one of the combs 8 or 9, depending on the direction of vertical travel of the comminuting unit, which includes the cutting cylinder and both combs. The combs are mounted on a shaft 10 provided with a laterally extending rib 11 which engages stop members 12 or 13 at opposite ends of its vertical travel. The engagement of rib 11 with stop members 12 or 13 oscillate shaft 10 to move combs 8 and 9 alternately into operative relationship with the cutting cylinder. A comminuting unit of the type hereinabove described is shown in detail and claimed in my Patent No. 2,672,985, granted March 23, 1954.

Cutting cylinder 6 is provided with a plurality of series of laterally projecting teeth 14 which are spaced longitudinally, relative to cylinder 6, to align them with screen bars 5. Teeth 14 enter the space between the outer edges of each screen bar as the rotation of the cylinder moves them past the screen, so that any solids caught in a screen bar are removed therefrom by teeth 14. The solids removed from screen 4 by teeth 14 are carried around to comb 8 or 9, and are then comminuted by the interengagement of the teeth with notches 15 in the edge of combs 8 and 9.

The rag catcher comprises a plate 16 curved to conform to the curvature of the periphery of cylinder 6 and is provided with apertures 17 through which fastener elements 18, such as rivets, extend to secure the rag catcher to the cylinder. Opposite ends of plate 16 are pointed, as indicated at 19, and are undercut, as indicated at 20. The pointed ends serve to split and dislodge sticks that may be caught between screen bars, regardless of the direction of rotation of the cutting cylinder. The purpose of the undercut is to facilitate catching of rags and similar debris and transferring them from the screen to the comb. The rotation of the cylinder causes the mass of rags removed from the screen to be wrapped around the cylinder. This mass constantly increases in size adjacent the screen where rags are added to it, and decreases in size adjacent the comb where a portion of the mass is comminuted. The surface of the cylinder still has some rag mass wrapped around it after passing the comb, and this mass acts as a brush or wiper to keep the spaces between the screen clean. The undercut is purposely made shallow, for example about one-sixteenth of an inch in depth, so that the rag catcher will not catch heavy wires or nails and carry them to the comb.

Although the rag catcher is illustrated as passing the screen while spaced a short distance from the face of the screen, it may be offset laterally a greater distance from the periphery of the cutting cylinder and may be narrow enough to enter the space between adjacent screen bars. The edge of the comb between notches 15 is preferably serrated, as indicated at 21, to cooperate with the outer surface of plate 16 to comminute fibrous solids, such as rags, as the rag catcher carries them past the serrated edge of the comb. The outer surface of plate 16 may also be roughened or serrated, if desired, to increase the comminuting action between the rag catcher and the comb.

In Figs. 6 and 7, I have illustrated a slightly different form of rag catcher. This embodiment is essentially the same as that previously described, except that the opposite ends 22 of the rag catcher 23 are cut back at a sharp angle on their underside, as indicated at 24. The rag catcher 23 is curved to conform with the curvatures of the periphery of cylinder 6 and is secured thereto in the same manner as the embodiment previously described. The ends 22 are pointed in the same manner as the ends 19 of the previous embodiment, and the undercuts 24 function in substantially the same manner as the undercuts 20.

While I have described a preferred embodiment of my invention in considerable detail, it will be understood that the description thereof is intended to be illustrative, rather than restrictive, as many details may be modified or changed without departing from the spirit or scope of the invention. For example, the rag catcher has been described in connection with one specific screen and comminuting unit, but it is obvious that its use is not limited thereto. It may be used with any type of cutting cylinder that operates either vertically or horizontally between a screen and a comminuting element to transfer solids from the screen to a comminuting zone removed therefrom. If the rag catcher is to be used on a cutting cylinder that does not change its direction of rotation, it may be pointed and undercut at only its forward end. Accordingly, I do not desire to be restricted to the exact construction described.

I claim:

A rag catcher for use on a rotatable cutting cylinder provided with a plurality of series of laterally projecting teeth spaced longitudinally relative to said cylinder, said rag catcher having means integral therewith adapting it to be mounted on the circumferential surface of said cylinder between any two adjacent series of teeth, said rag catcher comprising a plate pointed at each end and arranged to extend at right angles to the longitudinal axis of said cylinder, said plate being curved to fit the circumferential surface of said cylinder, each of said rag catchers being undercut adjacent its forward end.

References Cited in the file of this patent

UNITED STATES PATENTS

| | | |
|---|---|---|
| 1,847,990 | Stoner | Mar. 1, 1932 |
| 2,085,326 | Nordell | June 29, 1937 |
| 2,295,633 | Chase | Sept. 15, 1942 |
| 2,317,416 | Stanley | Apr. 27, 1943 |
| 2,322,922 | Chase | June 29, 1943 |
| 2,614,695 | Nordell | Oct. 21, 1952 |
| 2,672,985 | Nordell | Mar. 23, 1954 |